(12) United States Patent
Imamura et al.

(10) Patent No.: US 11,143,249 B2
(45) Date of Patent: Oct. 12, 2021

(54) DRIVING FORCE DISTRIBUTION CONTROL DEVICE

(71) Applicant: Mazda Motor Corporation, Hiroshima (JP)

(72) Inventors: Yasumasa Imamura, Aki-gun (JP); Naoki Nobutani, Aki-gun (JP); Keisuke Haruta, Aki-gun (JP); Daisuke Umetsu, Aki-gun (JP); Yasushi Yagi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/875,803

(22) Filed: May 15, 2020

(65) Prior Publication Data
US 2020/0370608 A1 Nov. 26, 2020

(30) Foreign Application Priority Data

May 24, 2019 (JP) .............................. JP2019-097920

(51) Int. Cl.
*F16D 48/06* (2006.01)

(52) U.S. Cl.
CPC .......... *F16D 48/064* (2013.01); *F16D 48/06* (2013.01); *F16D 2500/1022* (2013.01); *F16D 2500/10431* (2013.01); *F16D 2500/3108* (2013.01); *F16D 2500/3118* (2013.01); *F16D 2500/3144* (2013.01); *F16D 2500/3166* (2013.01); *F16D 2500/31446* (2013.01); *F16D 2500/70404* (2013.01)

(58) Field of Classification Search
None
See application file for complete search history.

(56) References Cited

U.S. PATENT DOCUMENTS

| | | | | |
|---|---|---|---|---|
| 5,924,510 | A * | 7/1999 | Itoh ........................ | B60K 23/08 180/197 |
| 2005/0160728 | A1* | 7/2005 | Puiu ................... | B60K 23/0808 60/435 |
| 2005/0177294 | A1* | 8/2005 | Jiang ..................... | F16D 48/066 701/67 |
| 2005/0177295 | A1* | 8/2005 | Rodrigues ............. | F16D 48/066 701/67 |
| 2016/0280064 | A1 | 9/2016 | Nozu et al. | |

FOREIGN PATENT DOCUMENTS

JP 20160179734 A 10/2016

* cited by examiner

*Primary Examiner* — Timothy Hannon
(74) *Attorney, Agent, or Firm* — Alleman Hall Creasman & Tuttle LLP

(57) ABSTRACT

A driving force distribution control device mounted on a four-wheel drive vehicle is provided. A coupling mechanism controller connects a drive shaft with an auxiliary driving wheel and sets a fastening force as a first fastening force, when an increase rate in an accelerator opening becomes more than a given value and a vehicle speed is below a given first speed, and changes the fastening force from the first fastening force to a second fastening force, when a slip of at least one of main driving wheels is detected after the fastening force is set to the first fastening force, and before a given time period has lapsed from the setting of the fastening force, or before the vehicle speed becomes faster than a given second speed. The second fastening force at least immediately after the change of the fastening force is a value larger than the first fastening force.

4 Claims, 5 Drawing Sheets

DRIVING FORCE DISTRIBUTION CONTROL DEVICE

TECHNICAL FIELD

The present disclosure belongs to a technical field related to a driving force distribution control device mounted on a four-wheel drive (4WD) vehicle.

BACKGROUND OF THE DISCLOSURE

Conventionally, JP2016-179734A discloses a four-wheel drive vehicle in which a two-wheel driving (2WD) state and a four-wheel driving (4WD) state are switchable. Among such four-wheel drive vehicles, there is a vehicle which automatically switches the driving state to the four-wheel driving state when a slip occurs in main driving wheels to which a driving force of a drive source is transmitted in the two-wheel driving state. Such a four-wheel drive vehicle is provided with a drive shaft for transmitting the driving force of the drive source to auxiliary driving wheels, and a clutch which connects or disconnects the auxiliary driving wheels to or from the drive shaft. When the slip occurs in the main driving wheels, the clutch immediately connects the auxiliary driving wheels to the drive shaft.

However, if the clutch immediately connects the auxiliary driving wheels to the drive shaft when the slip occurs in the main driving wheels, since the driving force transmitted to the auxiliary driving wheels increases rapidly and greatly, a shock occurs in the four-wheel drive vehicle, thereby giving people on board uncomfortableness.

SUMMARY OF THE DISCLOSURE

The present disclosure is made in view of such a situation, and one purpose thereof is to provide a driving force distribution control device capable of, when a slip occurs in main driving wheels of a four-wheel drive vehicle, promptly eliminating the slip while reducing a shock occurring in the four-wheel drive vehicle.

According to one aspect of the present disclosure, a driving force distribution control device mounted on a four-wheel drive vehicle, configured to automatically switch a state between a two-wheel driving state and a four-wheel driving state, is provided. The device includes a pair of left and right main driving wheels to which a driving force of a drive source is transmitted both in the two-wheel driving state and the four-wheel driving state, a pair of left and right auxiliary driving wheels to which the driving force is transmitted only in the four-wheel driving state, a drive shaft configured to transmit the driving force to the auxiliary driving wheels, a coupling mechanism configured to switch the state between the two-wheel driving state and the four-wheel driving state by disconnecting and connecting the drive shaft from and to the auxiliary driving wheel, respectively, and change a distribution of the driving force to the main driving wheels and the auxiliary driving wheels by adjusting the fastening force while the drive shaft is connected with the auxiliary driving wheels, a coupling mechanism controller including a processor, configured to control operation of the coupling mechanism, a vehicle speed sensor configured to detect a vehicle speed of the four-wheel drive vehicle, an accelerator opening sensor configured to detect an accelerator opening of the four-wheel drive vehicle, and a slip detector configured to detect a slip of the main driving wheels. The coupling mechanism controller connects the drive shaft with the auxiliary driving wheel and sets the fastening force as a first fastening force, when a rate of increase in the accelerator opening detected by the accelerator opening sensor becomes more than a given value while the drive shaft is disconnected from the auxiliary driving wheels and the vehicle speed detected by the vehicle speed sensor is below a given first speed, and changes the fastening force from the first fastening force to a second fastening force, when a slip of at least one of the main driving wheels is detected by the slip detector after the fastening force is set to the first fastening force, and before a given period of time has lapsed from the setting of the fastening force, or before the vehicle speed detected by the vehicle speed sensor becomes faster than a given second speed faster than the given first speed. The second fastening force at least immediately after the fastening force is changed from the first fastening force to the second fastening force is a value larger than the first fastening force.

According to this configuration, when the rate of increase in the accelerator opening becomes more than the given value while the drive shaft is disconnected from the auxiliary driving wheels (in the two-wheel driving state) and the vehicle speed is below the given first speed (a value near zero), that is a situation where the slip tends to occur in the main driving wheel due to the rapid accelerator operation by a driver of the four-wheel drive vehicle, the fastening force is set beforehand as the first fastening force, and when the slip occurs in the main driving wheel in such a situation, the fastening force is changed from the first fastening force to the second fastening force. As a result, since the fastening force increases gradually through the first fastening force, the driving force transmitted to the auxiliary driving wheel will not increase rapidly and largely, and a shock is prevented from occurring in the vehicle. Moreover, when the slip occurs in the main driving wheel, since the fastening force is changed from the first fastening force to the second fastening force which can eliminate the slip, the fastening force can be changed quicker than the case where it is changed from zero to the second fastening force, thereby promptly eliminating the slip.

The coupling mechanism controller may reduce the fastening force to zero from the first fastening force, after the fastening force is set to the first fastening force, and when the given period of time has lapsed from the setting of the fastening force, without the slip of both the main driving wheels being detected by the slip detector, or when the vehicle speed detected by the vehicle speed sensor becomes faster than the given second speed, without the slip of both the main driving wheels being detected by the slip detector.

According to this configuration, when the given period of time has lapsed from the setting of the first fastening force or when the vehicle speed becomes faster than the given second speed, without the slip of both the main driving wheels being detected, since it can be determined that it becomes in a situation where the slip does not occur, setting the fastening force to zero will not cause any problems. Therefore, setting the fastening force to zero (changing to the two-wheel driving state) reduces a loss of the driving force of the drive source and, thus, a fuel efficiency improves.

The coupling mechanism controller may set the second fastening force to a value according to an amount of slip detected by the slip detector.

According to this configuration, the second fastening force can be set as the suitable value for eliminating the slip occurred in the main driving wheels, without setting the second fastening force to an unnecessarily large value.

DETAILED DESCRIPTION OF THE DISCLOSURE

Hereinafter, one embodiment of the present disclosure is described in detail with reference to the accompanying drawings.

Figure 1:
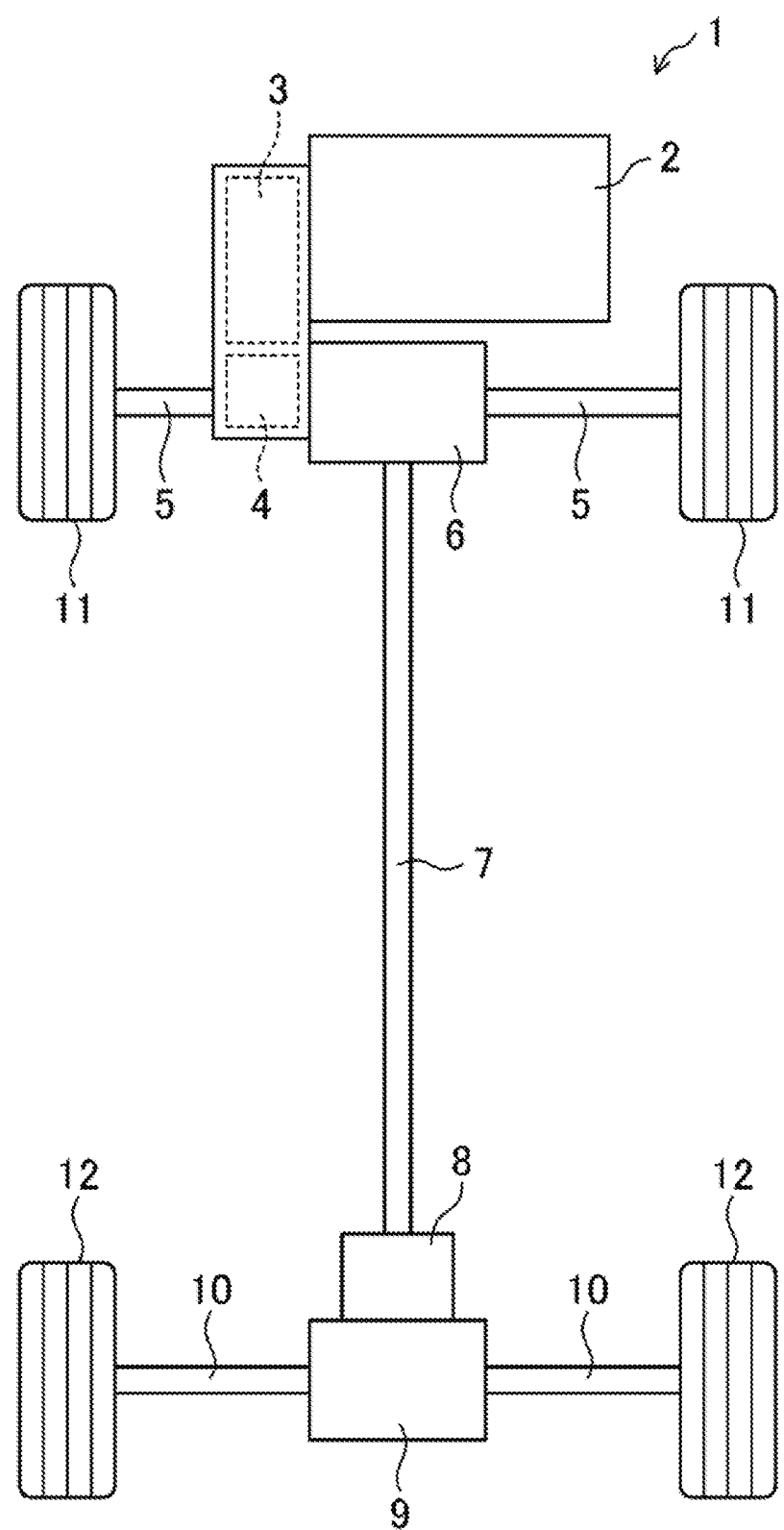
FIG. 1 is a view schematically illustrating the overall configuration of a four-wheel drive vehicle to which a driving force distribution control device according to one embodiment of the present disclosure is mounted.

FIG. 1 schematically illustrates the overall configuration of a four-wheel drive vehicle 1 to which a driving force distribution control device according to this embodiment of the present disclosure is mounted. The four-wheel drive vehicle 1 (hereinafter, referred to as "the vehicle 1") is configured so that switching of a state between a two-wheel driving (2WD) state and a four-wheel driving (4WD) state is performed automatically, independent from operation by a driver of the vehicle 1.

The vehicle 1 is based on a front engine, front wheel drive (FF) vehicle, where an engine 2 is disposed in an engine bay provided to a front part of the vehicle 1 as a drive source.

When the vehicle 1 is in the two-wheel driving state, a driving force (driving torque) of the engine 2 is transmitted to left and right front wheels 11. On the other hand, when the vehicle 1 is in the four-wheel driving state, the driving force of the engine 2 is transmitted to the left and right front wheels 11 and left and right rear wheels 12. Thus, the front wheels 11 are used as main driving wheels to which the driving force of the engine 2 is transmitted both in the two-wheel driving state and the four-wheel driving state, and the rear wheels 12 are used as auxiliary driving wheels to which the driving force of the engine 2 is transmitted only in the four-wheel driving state. Note that in this embodiment, the front wheels 11 are also used as steering wheels.

The driving force of the engine 2 is transmitted to a pair of left and right front drive shafts 5 extending in a vehicle width direction through a transmission 3 and a front differential mechanism 4, and is then transmitted to the left and right front wheels 11 from the front drive shaft 5. The transmission 3 and the front differential mechanism 4 are constituted as one unit.

The driving force of the engine 2 is also transmitted from the front differential mechanism 4 to a PTO (Power Take Off) 6 corresponding to a transfer, and is then transmitted to a propeller shaft 7 (drive shaft) for transmitting the driving force to the left and right rear wheels 12 from the PTO 6.

The propeller shaft 7 is located between the front wheels 11 and the rear wheels 12 in a front-and-rear direction of the vehicle 1 and extends in the front-and-rear direction. A front end of the propeller shaft 7 is coupled to the PTO 6, and a rear end of the propeller shaft 7 is coupled to an electromagnetic coupling mechanism 8 (described later).

The electromagnetic coupling mechanism 8 is provided between the propeller shaft 7 and the left and right rear wheels 12 (in detail, between the propeller shaft 7 and a rear differential mechanism 9). Although description of the detailed configuration is omitted, the electromagnetic coupling mechanism 8 has an actuator which is operated by an electromagnetic force, and a plurality of friction plates which are pressed against each other as the actuator operates. As the plurality of friction plates are pressed against each other, the propeller shaft 7 is connected with the rear wheels 12 (rear differential mechanism 9). Note that the actuator is not limited to those which are operated by the electromagnetic force.

By generating and not generating the electromagnetic force, the electromagnetic coupling mechanism 8 connects and disconnects the propeller shaft 7 to and from the rear wheels 12 (rear differential mechanism 9) by the actuator pressing and not pressing the friction plates. That is, the electromagnetic coupling mechanism 8 switches the state between the two-wheel driving state and the four-wheel driving state by disconnecting and connecting the propeller shaft 7 from and to the rear wheels 12, respectively. When the vehicle 1 is in the four-wheel driving state, the driving force transmitted to the propeller shaft 7 is transmitted to the rear wheels 12 through the electromagnetic coupling mechanism 8, the rear differential mechanism 9, and a pair of left and right rear drive shafts 10.

Moreover, the electromagnetic coupling mechanism 8 is configured to change a fastening force (connecting force) when the propeller shaft 7 is connected with the rear wheels 12 by adjusting the magnitude of the generated electromagnetic force (the pressing force of the friction plates), and change a distribution of the driving force to the front wheels 11 and the rear wheels 12 by changing the fastening force.

Figure 2:
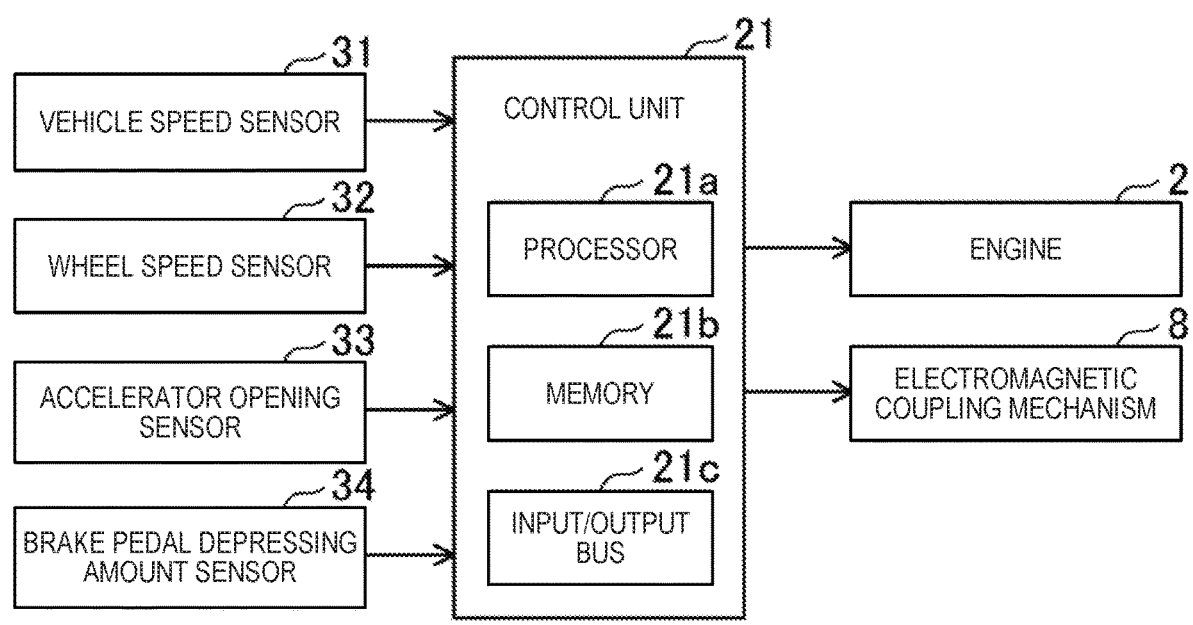
FIG. 2 is a block diagram illustrating a configuration of a control system of the driving force distribution control device.

As illustrated in FIG. 2, a control unit 21 (coupling mechanism controller) which controls operation of the electromagnetic coupling mechanism 8 is provided to the vehicle 1. In this embodiment, although the control unit 21 also controls operation of the engine 2, the operation of the engine 2 may be controlled by another control unit.

The control unit 21 is a controller based on a well-known microcomputer. The control unit 21 includes a processor 21a, a memory 21b, and an input/output bus 21c. The processor 21a is a central processing unit (CPU) which executes a computer program (including a basic control program, such as an operating system (OS), and application program(s) which is booted on the OS and implements specific function(s)). The memory 21b is comprised of RAM and ROM. The ROM stores various computer programs (control programs for controlling the operation of the engine 2 and the electromagnetic coupling mechanism 8), various data, etc. The RAM is memory where a processing area used when the CPU 21a executes a series of processings is provided. The input/output bus 21c inputs and outputs an electric signal to/from the control unit 21.

The control unit 21 accepts inputs of a signal from a vehicle speed sensor 31 which detects a speed of the vehicle 1, signals from four wheel speed sensors 32 (only one is illustrated in FIG. 2) which detect wheel speeds of the two front wheels 11 and the two rear wheels 12, a signal from an accelerator opening sensor 33 which detects an accelerator opening corresponding to a depressing amount of an accelerator pedal by the driver of the vehicle 1, and a signal from a brake pedal depressing amount sensor 34 which detects a depressing amount of a brake pedal by the driver. The control unit 21 also accepts inputs of signals from various sensors required for the control of the engine 2.

The control unit 21 processes the inputted signals by the processor 21a according to the computer program stored in the ROM of the memory 21b to control the operation of the engine 2 and the electromagnetic coupling mechanism 8.

Below, an operation control of the electromagnetic coupling mechanism 8 by the control unit 21 is described in detail.

Fundamentally, the control unit 21 disconnects the propeller shaft 7 from the rear wheels 12 (sets the vehicle 1 to the two-wheel driving state). On the other hand, while the propeller shaft 7 is disconnected from the rear wheels 12 and the vehicle speed detected by the vehicle speed sensor 31 is below a given first speed, the control unit 21 connects the propeller shaft 7 to the rear wheels 12 and sets the fastening force as a first fastening force, when the rate of increase in the accelerator opening detected by the accelerator opening sensor 33 becomes more than a given value (see a time t1 in FIGS. 3 and 4).

The given first speed is set to a value near zero, for example, the maximum value of the speed when the vehicle travels using a creep force of the transmission 3. Thus, while the vehicle speed is below the given first speed in the two-wheel driving state (the vehicle speed is set to 0 in FIGS. 3 and 4), a slip tends to occur in the front wheels 11 when the rate of increase in the accelerator opening becomes more than the given value because of a rapid accelerator operation by the driver of the vehicle 1. Therefore, the fastening force is set beforehand as the first fastening force before a slip actually occurs. In this embodiment, the first fastening force is a constant value.

Figure 3:
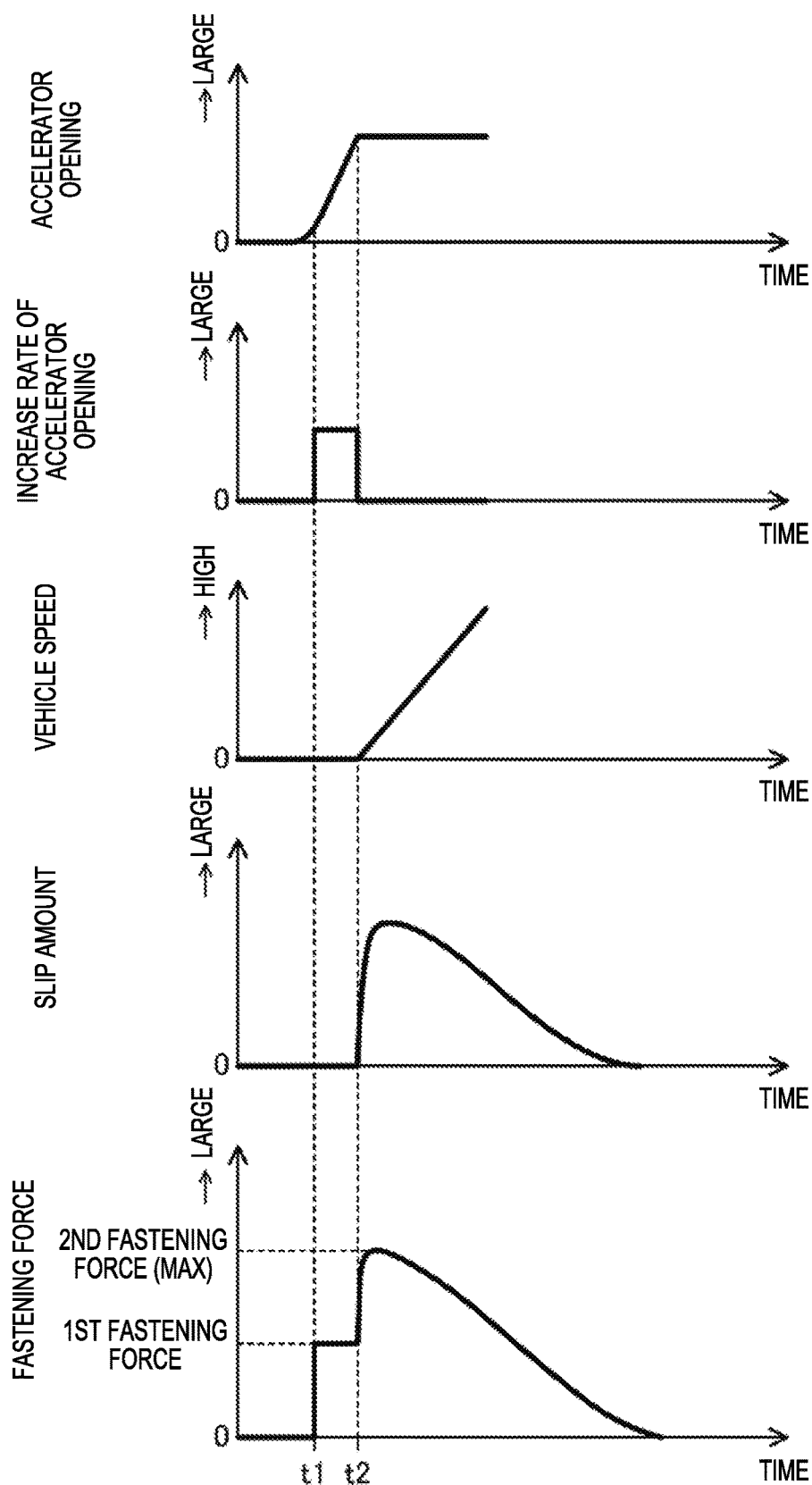
FIG. 3 is a time chart illustrating changes in a fastening force, an accelerator opening, a rate of increase in the accelerator opening, a vehicle speed, and an amount of slip of a front wheel, when a slip of at least one of front wheels is detected after setting a fastening force of a propeller shaft and rear wheels by an electromagnetic coupling mechanism to a first fastening force.

Then, the control unit 21 changes the fastening force from the first fastening force to a second fastening force after the fastening force is set to the first fastening force, and before a given period of time has lapsed since the fastening force is set, or when a slip of at least one of the front wheels 11 is detected before the vehicle speed detected by the vehicle speed sensor 31 becomes faster than a given second speed faster than the given first speed (see a time t2 of FIG. 3).

The slip of each front wheel 11 is detectable from an amount of slip which can be found from the wheel speed of each front wheel 11 detected by the wheel speed sensor 32, and the vehicle speed detected by the vehicle speed sensor 31. Therefore, the vehicle speed sensor 31 and the wheel speed sensor 32 constitute a slip detector which detects the slip of the front wheel(s) 11 (main driving wheel(s)).

The second fastening force at least immediately after changed from the first fastening force to the second fastening force is a larger value than the first fastening force (see FIG. 3). That is, since the slip of the front wheel occurs while the propeller shaft 7 is connected with the rear wheels 12 by the first fastening force, it is necessary to increase the fastening force from the first fastening force to the second fastening force in order to eliminate the slip.

In this embodiment, the control unit 21 sets the second fastening force as a value according to the amount of slip (a value which can eliminate the slip). When the slip occurs in both the left and right front wheels 11, the second fastening force is desirable to be set to a value according to a larger amount among the amounts of slip of the left and right front wheels 11. Thus, by the second fastening force being set to the value according to the amount of slip, the second fastening force can be set to the suitable value for eliminating the slip occurred in the front wheels 11, without setting the second fastening force to an unnecessarily large value. The second fastening force becomes the maximum substantially immediately after the change of the fastening force, and this maximum value is a value corresponding to the maximum value of the amount of slip.

Figure 4:
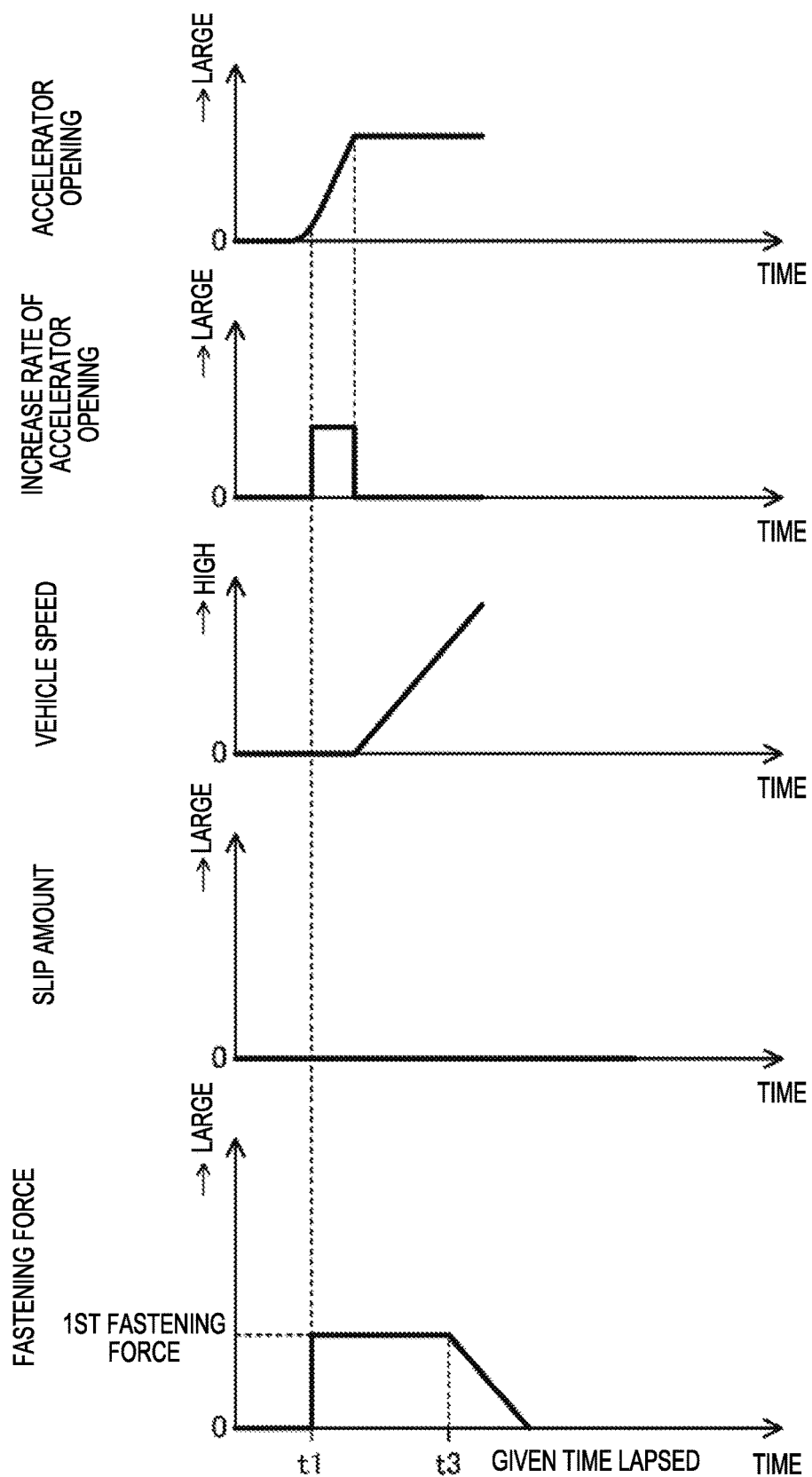
FIG. 4 is a time chart illustrating changes in the fastening force, the accelerator opening, the rate of increase in the accelerator opening, the vehicle speed, and the amount of slip of the front wheel, when no slip of both of front wheels is detected after setting the fastening force to the first fastening force.

On the other hand, after the control unit 21 sets the fastening force as the first fastening force, it reduces the fastening force from the first fastening force to zero, when the given period of time has lapsed from the setting of the fastening force without the slips of the both the left and right front wheels 11 being detected, or when the vehicle speed detected by the vehicle speed sensor 31 becomes faster than the given second speed, without the slips of the both the left and right front wheels 11 being detected (see a time t3 of FIG. 4). That is, when the given period of time has lapsed after the setup of the first fastening force without the slips of the both the left and right front wheels 11 being detected, or when the vehicle speed becomes faster than the given second speed without the slips of the both the left and right front wheels 11 being detected, since the control unit 21 can determine that it becomes in a situation where the slip does not occur, setting the fastening force to zero (changing to the two-wheel driving state) will not cause any problems, and therefore, the fastening force is reduced as soon as possible to reduce loss of the driving force of the engine 2. Note that when reducing the fastening force from the first fastening force to zero, the fastening force is reduced gradually not to give persons on board uncomfortableness, as illustrated in FIG. 4.

In this embodiment, since the second fastening force is set to the value according to the amount of slip of the front wheel 11, the second fastening force is larger than the first fastening force immediately after the fastening force is changed from the first fastening force to the second fastening force, but it becomes smaller as the amount of slip gradually decreases (see FIG. 3). In due course, the second fastening force becomes the same value as the first fastening force. When the timing at which the second fastening force becomes the same value as the first fastening force is before the given period of time has lapsed after the setting of the first fastening force, or before the vehicle speed detected by the vehicle speed sensor 31 becomes faster than the given second speed, the second fastening force is set to the value that is the same as the first fastening force after this timing. In this state, when the given period of time has lapsed after the setup of the first fastening force, or when the vehicle speed detected by the vehicle speed sensor 31 becomes faster than the given second speed, the second fastening force is reduced to zero from the same value as the first fastening force, similar to the case where the slip of the front wheel 11 is not detected after the setup of the first fastening force.

On the other hand, the timing at which the second fastening force becomes the same value as the first fastening force is after the given period of time from the setting of the first fastening force, or after the vehicle speed detected by the vehicle speed sensor 31 becomes faster than the given second speed, the second fastening force is set smaller according to the amount of slip as it is, and as the amount of slip becomes zero, the second fastening force is set to zero (changed to the two-wheel driving state), as illustrated in FIG. 3.

Note that the second fastening force may be a constant value similar to the first fastening force. In this case, the second fastening force is reduced gradually to zero from the constant value, when the given period of time has lapsed after the setup of the first fastening force, or when the vehicle speed detected by the vehicle speed sensor 31 becomes faster than the given second speed.

Figure 5:
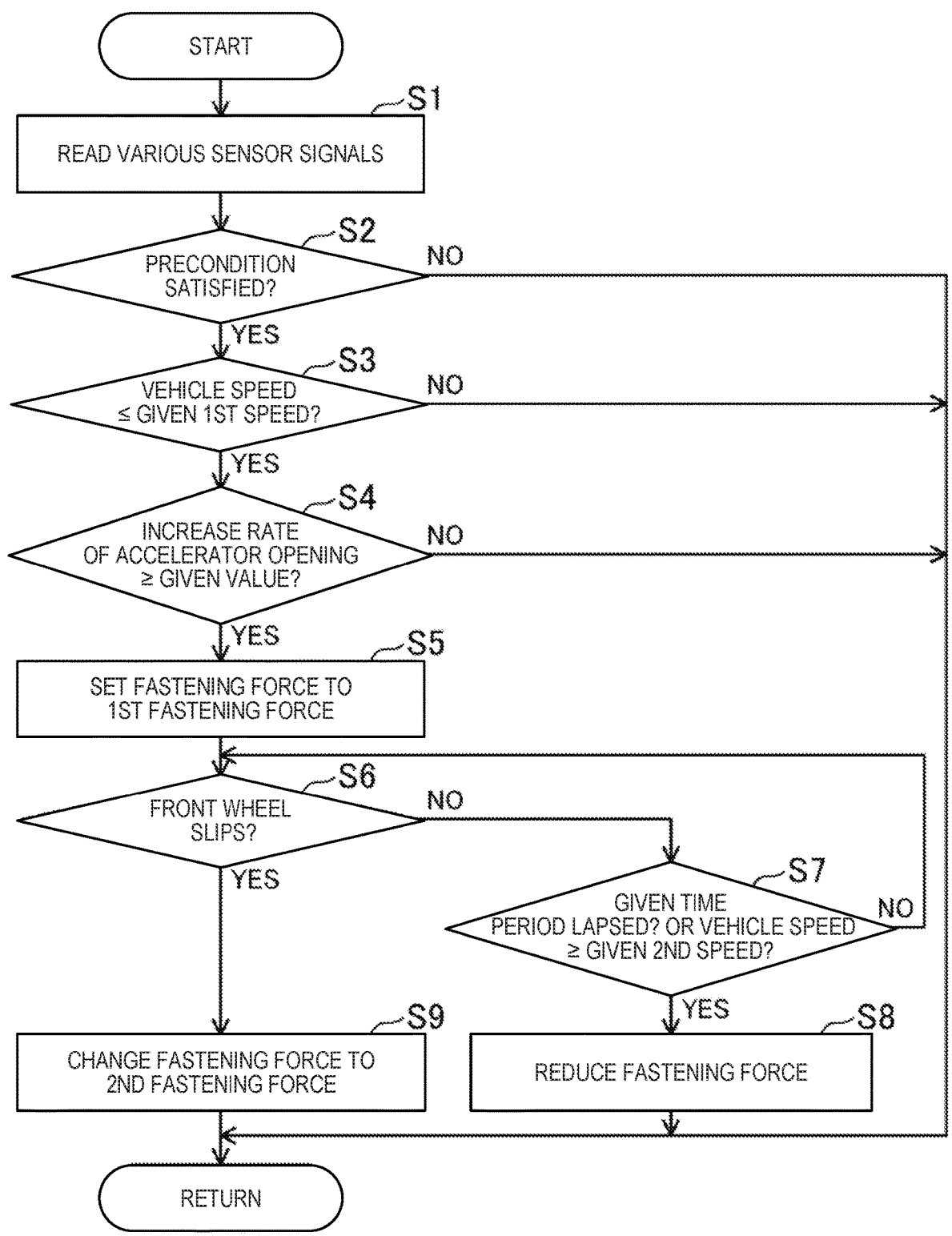
FIG. 5 is a flowchart illustrating a processing operation of a control of the electromagnetic coupling mechanism by a control unit.

Here, a processing operation of a control of the electromagnetic coupling mechanism 8 executed by the control unit 21 is described with reference to the flowchart of FIG. 5.

First, at Step S1, the control unit 21 reads the signals from various sensors, and then determines at subsequent Step S2 whether a precondition is satisfied. This precondition is a condition in which the propeller shaft 7 is not connected with the rear wheels 12 (the vehicle 1 is in the two-wheel driving state). In addition to this condition, the precondition may include a road on which the vehicle 1 travels has a low coefficient of friction which is below a given reference value, and the depressing amount of the brake pedal detected by the brake pedal depressing amount sensor 34 is below a given amount.

If the determination at Step S2 is NO, the control unit 21 returns the processing, and on the other hand, if the determination at Step S2 is YES, it shifts to Step S3.

At Step S3, the control unit 21 determines whether the vehicle speed detected by the vehicle speed sensor 31 is below the given first speed. If the determination at Step S3 is NO, the control unit 21 returns the processing, and on the other hand, if the determination at Step S3 is YES, it shifts to Step S4.

At Step S4, the control unit 21 determines whether the rate of increase in the accelerator opening detected by the accelerator opening sensor 33 is more than the given value. If the determination at Step S4 is NO, the control unit 21 returns the processing, and on the other hand, if the determination at Step S4 is YES, it shifts to Step S5, where it sets the fastening force of the propeller shaft 7 with the rear wheels 12 by the electromagnetic coupling mechanism 8 as the first fastening force.

At the subsequent Step S6, the control unit 21 determines whether the slip occurs in at least one of the front wheels 11, and if the determination of Step S6 is NO, the control unit 21 shifts to Step S7, and on the other hand, if the determination at Step S6 is YES, it shifts to Step S9.

At Step S7, the control unit 21 determines whether the given period of time has lapsed after the setup of the first fastening force, or whether the vehicle speed detected by the vehicle speed sensor 31 becomes faster than the given second speed.

If the determination at Step S7 is NO, the control unit 21 returns to Step S6, and on the other hand, if the determination at Step S7 is YES, it shifts to Step S8, where it reduces the fastening force to zero from the first fastening force and then returns the processing.

At Step S9 after the determination at Step S6 being YES, the control unit 21 changes the fastening force to the second fastening force and then returns the processing. As described above, the second fastening force is larger than the first fastening force immediately after the fastening force is changed from the first fastening force to the second fastening force, and it becomes smaller as the amount of slip of the front wheel 11 decreases. Note that although omitted in the flowchart of FIG. 5, the attitude of the reduction in the second fastening force differs depending on the timing at which the second fastening force becomes the same value as the first fastening force.

Therefore, in this embodiment, when it is in the situation where the slip tends to occur in the front wheel 11 due to the rapid accelerator operation by the driver of the vehicle 1, the fastening force is set beforehand as the first fastening force, and when the slip occurs in the front wheel 11 while the fastening force being set to the first fastening force, the fastening force is changed from the first fastening force to the second fastening force. As a result, since the fastening force increases gradually through the first fastening force, the driving force transmitted to the rear wheel 12 will not increase rapidly and largely, and the shock is prevented from occurring in the vehicle 1. Moreover, when the slip occurs in the front wheel 11, since the fastening force is changed from the first fastening force to the second fastening force which can eliminate the slip, the fastening force can be changed quicker than the case where it is changed from zero to the second fastening force, thereby promptly eliminating the slip.

The present disclosure is not limited to the above embodiment, and it may be changed or modified without departing from the spirit of the appended claims.

Therefore, the above embodiment is merely illustration and the scope of the present disclosure is not to be interpreted restrictively. The scope of the present disclosure is defined by the appended claims, and all of the modifications and changes which belong to equivalents of the claims fall within the present disclosure.

The present disclosure is useful for the driving force distribution control device mounted on the four-wheel drive vehicle, which automatically switches the state between the two-wheel driving state and the four-wheel driving state.

DESCRIPTION OF REFERENCE CHARACTERS

1 Four-Wheel Drive Vehicle
2 Engine (Drive Source)
7 Propeller Shaft (Drive Shaft)
8 Electromagnetic Coupling Mechanism (Coupling Mechanism)
11 Front Wheel (Main Driving Wheel)
12 Rear Wheel (Auxiliary Driving Wheel)
21 Control Unit
31 Vehicle Speed Sensor (Slip Detector)
32 Wheel Speed Sensor (Slip Detector)
33 Accelerator Opening Sensor

What is claimed is:

1. A driving force distribution control device mounted on a four-wheel drive vehicle, configured to automatically switch a state between a two-wheel driving state and a four-wheel driving state, comprising:
   a pair of left and right main driving wheels to which a driving force of a drive source is transmitted both in the two-wheel driving state and the four-wheel driving state;
   a pair of left and right auxiliary driving wheels to which the driving force is transmitted only in the four-wheel driving state;
   a drive shaft configured to transmit the driving force to the auxiliary driving wheels;
   a coupling mechanism configured to switch the state between the two-wheel driving state and the four-wheel driving state by disconnecting and connecting the drive shaft from and to the auxiliary driving wheels, respectively, and change a distribution of the driving force to the main driving wheels and the auxiliary driving wheels by adjusting the fastening force while the drive shaft is connected to the auxiliary driving wheels;

a coupling mechanism controller including a processor, configured to control operation of the coupling mechanism;

a vehicle speed sensor configured to detect a vehicle speed of the four-wheel drive vehicle;

an accelerator opening sensor configured to detect an accelerator opening of the four-wheel drive vehicle; and a slip detector configured to detect a slip of the main driving wheels, wherein the coupling mechanism controller connects the drive shaft with the auxiliary driving wheel and sets the fastening force to a first fastening force, when a rate of increase in the accelerator opening detected by the accelerator opening sensor becomes more than a given value while the drive shaft is disconnected from the auxiliary driving wheels and the vehicle speed detected by the vehicle speed sensor is below a given first speed, and changes the fastening force from the first fastening force to a second fastening force, when a slip of at least one of the main driving wheels is detected by the slip detector after the fastening force is set to the first fastening force, and before a given period of time has lapsed from the setting of the fastening force, or before the vehicle speed detected by the vehicle speed sensor becomes faster than a given second speed faster than the given first speed, and wherein the second fastening force at least immediately after the fastening force is changed from the first fastening force to the second fastening force is a value larger than the first fastening force.

2. The driving force distribution control device of claim 1, wherein the coupling mechanism controller reduces the fastening force to zero from the first fastening force, after the fastening force is set to the first fastening force, and when the given period of time has lapsed from the setting of the fastening force, without the slip of both the main driving wheels being detected by the slip detector, or when the vehicle speed detected by the vehicle speed sensor becomes faster than the given second speed, without the slip of both the main driving wheels being detected by the slip detector.

3. The driving force distribution control device of claim 2, wherein the coupling mechanism controller sets the second fastening force to a value according to an amount of slip detected by the slip detector.

4. The driving force distribution control device of claim 1, wherein the coupling mechanism controller sets the second fastening force to a value according to an amount of slip detected by the slip detector.

* * * * *